United States Patent [19]
Ogami et al.

[11] Patent Number: 5,010,859
[45] Date of Patent: Apr. 30, 1991

[54] CHAIN COVER FOR V-TYPE ENGINE

[75] Inventors: Etsuo Ogami, Yokohama; Yoshio Iwasa, Nagareyama, both of Japan

[73] Assignee: Nissan Motor Company, Ltd. of No. 2, Yokohama, Japan

[21] Appl. No.: 498,245

[22] Filed: Mar. 14, 1990

[30] Foreign Application Priority Data

Mar. 15, 1989 [JP] Japan .................................. 1-60886

[51] Int. Cl.[5] .............................................. F02F 7/00
[52] U.S. Cl. .............................. 123/195 C; 123/90.31
[58] Field of Search ............. 123/90.27, 90.31, 145 C, 123/198 E

[56] References Cited

U.S. PATENT DOCUMENTS 4,729,348  3/1988  Okada et al. ...................... 123/90.31
4,750,455  6/1988  Ebesu .............................. 123/90.31

FOREIGN PATENT DOCUMENTS 60-50208  3/1985  Japan .
62-66252  4/1987  Japan .
208504    8/1989  Japan ............................... 123/90.31

Primary Examiner—Noah P. Kamen
Attorney, Agent, or Firm—Pennie & Edmonds

[57] ABSTRACT

A V-type engine includes first and second camshafts rotatably mounted to cylinder heads, respectively. A first chain drivingly interconnects a crankshaft and the first camshaft, whereas a second chain drivingly interconnects the crankshaft and the second camshaft. First and second tensioners provide the tensions to the first and second chains, respectively. For concealing the first and second chains, the engine has a cover formed with two openings positioned in accordance with the first and second tensioners.

3 Claims, 3 Drawing Sheets

CHAIN COVER FOR V-TYPE ENGINE

RELATED APPLICATION

The present application is related to U.S. patent Ser. No. unknown filed by the same applicant, claiming priority on Japanese Patent Application Serial No. 63-326033 filed on Dec. 5, 1989.

BACKGROUND OF THE INVENTION

This application is related to co-pending application Ser. No. 07/450,509 which was filed May 30, 1990.

The present invention relates to a chain cover for a V-type engine and, particularly to a cover for two timing chains which drive at least one camshaft mounted to cylinder heads, respectively.

Japanese Utility Model Publication No. 62-66252 discloses a camshaft driving arrangement and a belt cover for a V-type engine as shown in FIG. 4.

Referring to FIG. 4, there is shown a V-type engine. A crankshaft 72 is rotatably mounted to the cylinder block 71 at the lower portion thereof. A o crank sprocket 73 and an accessory driving sprocket 81 are mounted to the crankshaft 72. The cylinder block 71 is bifurcated to form two cylinder banks 71a, 71b.

Two cylinder heads 74A, 74B are disposed on the cylinder banks 71a, 71b, respectively. Rotatably mounted to the cylinder heads 74A, 74B are camshafts 75 for intake and exhaust valves (not shown). Cam sprockets 76 are fixedly mounted to the ends of the camshafts 75, respectively. A timing belt 77 drivingly interconnects the crank sprocket 73 and cam sprockets 76. In order to secure a space for disposing an accessory between the two cylinder banks 71a, 71b, the timing belt 77 is directed its course by an idler 80. The tension of the belt 77 is set to a predetermined value by a tensioner 78 mounted on an end wall of the cylinder block 71.

Rotation of the crankshaft 72 is transmitted to both of the camshafts 75 through the timing belt 77 thus driving the intake and exhaust valves. The engine includes a belt cover 79 which conceals the timing belt 77 and the tensioner 78. The belt cover 79 has its upper end extending to a position below the camshafts 75, and its lower end extending to a position corresponding to the crank sprocket 73.

With such belt cover of the known engine, it is necessary to remove the belt cover 79 when the tension of the timing belt 77 is set to a predetermined value by the tensioner 78. Since the tensioner 78 is concealed by the belt cover 79 which has its upper end extending to a position below the camshafts 75, and its lower end extending to a position corresponding to the crank sprocket 73, removing the belt cover 79 requires a lot of time. On the other hand, when a predetermined value of tension is applied to the timing belt 77, it is difficult to mount and remove the cylinder heads 74A 74B, the camshafts 75, and the cam sprockets 76.

An object of the present invention is to provide an advantageous solution to such problems.

Another object of the present invention is to provide a V-type engine which gives an easy access to two tensioners.

SUMMARY OF THE INVENTION

There is provided, according to the present invention, in a V-type engine having a cylinder block bifurcated to form two cylinder banks, two cylinder heads mounted on the cylinder banks, and a crankshaft:
- a first camshaft rotatably mounted to one of the cylinder heads;
- a second camshaft rotatably mounted to the other of the cylinder heads;
- a first chain drivingly interconnecting the crankshaft and said first camshaft;
- a second chain drivingly interconnecting the crankshaft and said second camshaft;
- first and second tensioners so constructed and arranged as to provide the tensions to said first and second chains, respectively; and
- a cover so constructed and arranged as to conceal said first and second chains, said cover being formed with two openings positioned in accordance with said first and second tensioners.

DETAILED DESCRIPTION OF THE INVENTION

Figure 1:
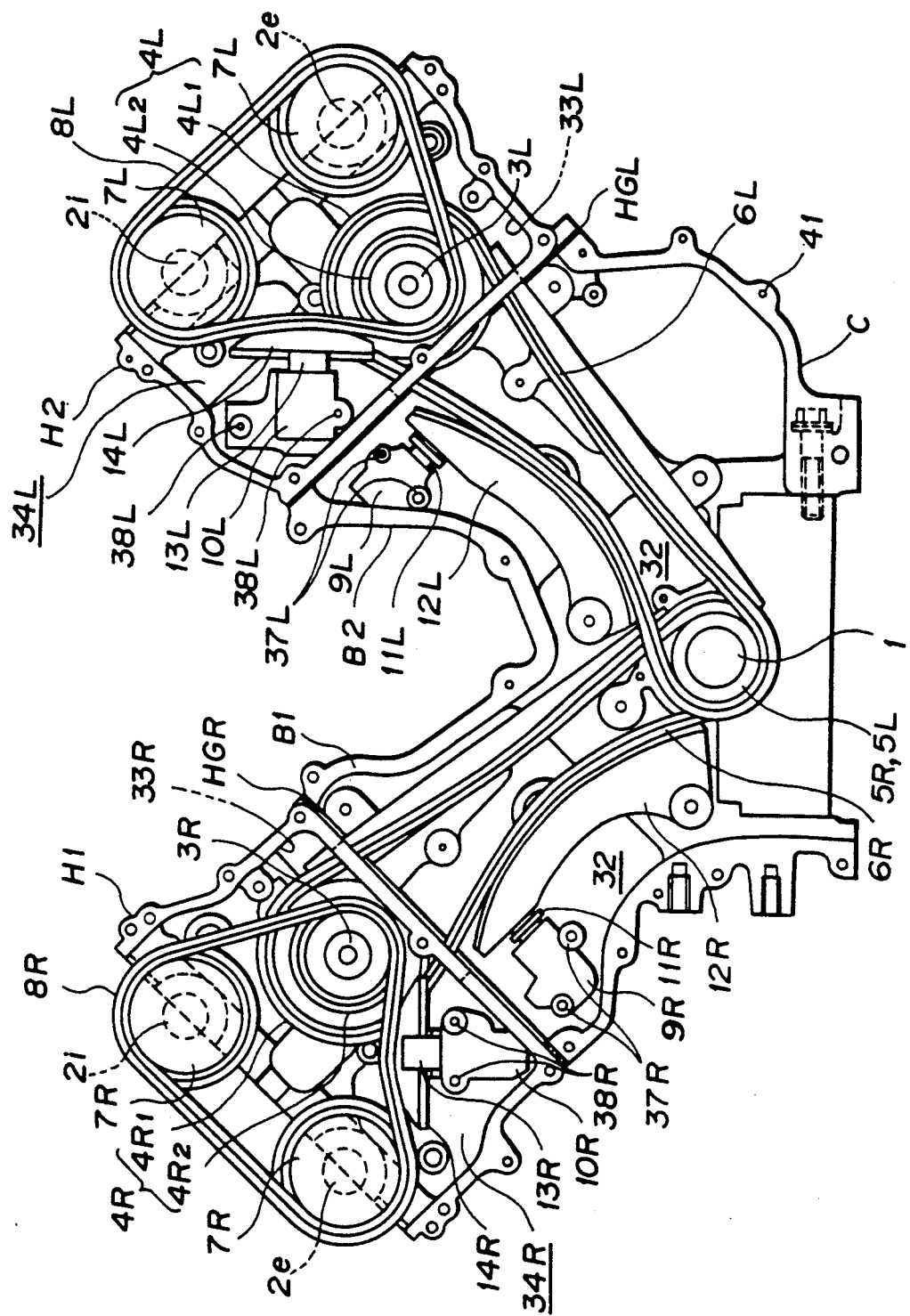
FIG. 1 is an axial end view of a V-type engine with a chain cover removed.

Referring to the drawings, a preferred embodiment of the present invention will be described.

It should be noted that since right and left cylinder banks B1, B2 are the same in structure, a description will be made principally with regard to components of the right (left as viewed in FIG. 1) cylinder bank B1.

Referring first to FIG. 1, a V-type engine includes a cylinder block C bifurcated to form the two cylinder banks B1, B2. Two cylinder heads H1, H2 are mounted on the top of the cylinder banks B1, B2 through head gaskets HGR, HGL, respectively.

A crankshaft 1, which is driven by the engine, is rotatably mounted to the cylinder block C at the lower portion thereof. A pair of camshafts 2e, 2i are rotatably mounted to the cylinder head H1 at the upper portion thereof One 2i of the camshafts is arranged to open and close intake valves (not shown), whereas the other 2e is arranged to open and close exhaust valves (not shown).

Figure 2:
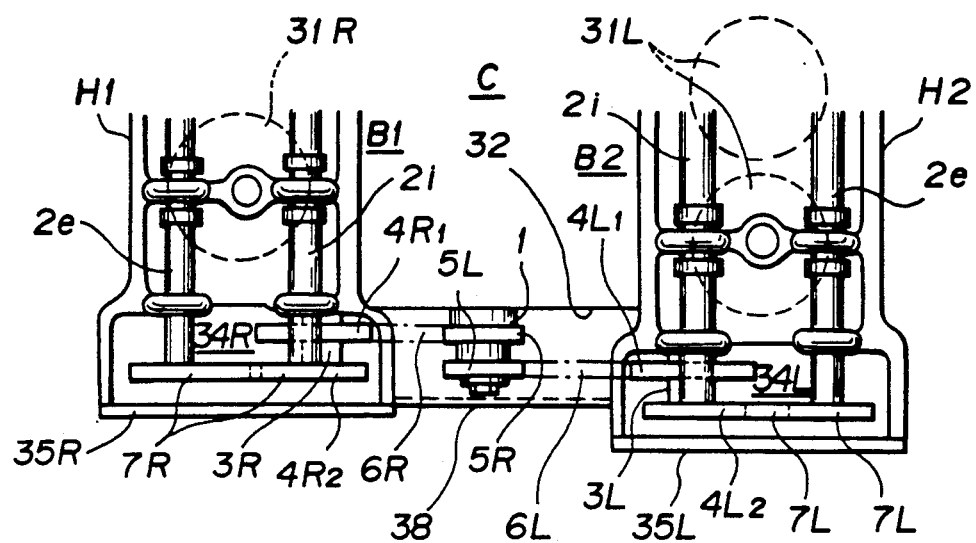
FIG. 2 is a fragmentary plan view, with the chain cover, as viewed from the top in FIG. 1.

One B1 of the two cylinder banks includes a plurality of cylinders 31R offset from a plurality of cylinders 31L of the other bank B2. As best seen in FIG. 2, the cylinders 31L of the cylinder bank B2 are located nearer to an outer wall 32 than the cylinders 31R of the cylinder bank B1 are.

A sprocket chamber 34R is formed at an end wall of the cylinder head H1, and walls defining the sprocket chamber 34R include upper, side, and lower openings. The side opening 33R is concealed by a cover 35R in a seal-tight manner.

A countershaft 3R is rotatably mounted to the cylinder head H1, and protruded from an end wall 32 of the cylinder head H1. An idler gear 4R, which includes a relatively large diameter gear $4R_1$ and a relatively small diameter gear $4R_2$, is coupled with the countershaft 3R.

On the other hand, crank sprockets 5R, 5L are coupled with the crankshaft 1. A timing chain 6R drivingly interconnects the crank sprocket 5R and the large diameter gear 4R₁ of the idler gear 4R. As best seen in FIG. 2, the crank sprocket 5L is located further from the outer wall 32 than the crank sprocket 5R is, so that a timing chain 6L is located nearer with regard to the end of the cylinder block C than the timing chain 6R is. A camshaft driving chain 8R drivingly interconnects two cam sprockets 7R of the camshafts 2e, 2i and the small diameter gear 4R₂ of the idler gear 4R. The idler gear 4R, the cam sprockets 7R, and the camshaft driving chain 8R are arranged in the sprocket chamber 34R.

For preventing the chains 6R, 8R from shaking, two tensioners 9R, 10R provide the tensions to the chains 6R, 8R, respectively. The tensioners 9R, 10R include pistons 11R, 13R for pressing the chains 6R, 8R by way of a hydraulic fluid, and guides 12R, 14R for smoothly moving the chains 6R, 8R, respectively. It is possible to release the tensions by adjusting releasing bolts 37R, 38R.

Figure 3:
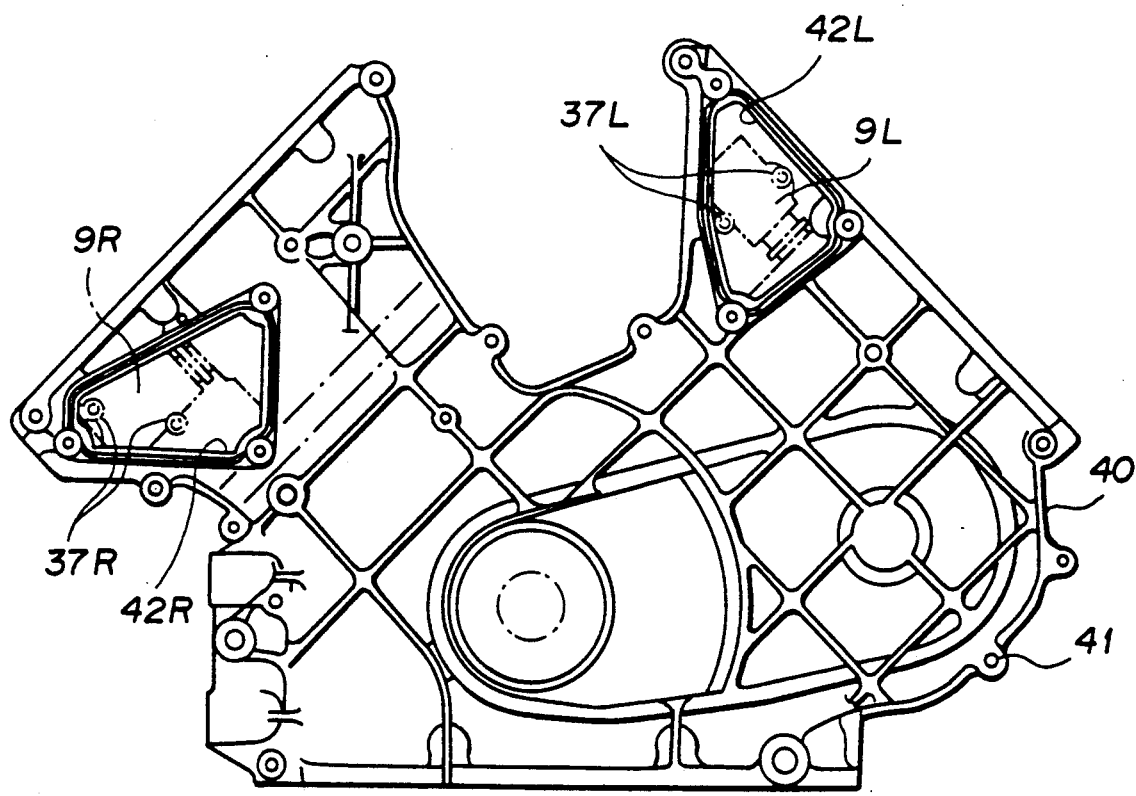
FIG. 3 is a plan view illustrating a preferred embodiment of the chain cover according to the present invention.
Figure 4:
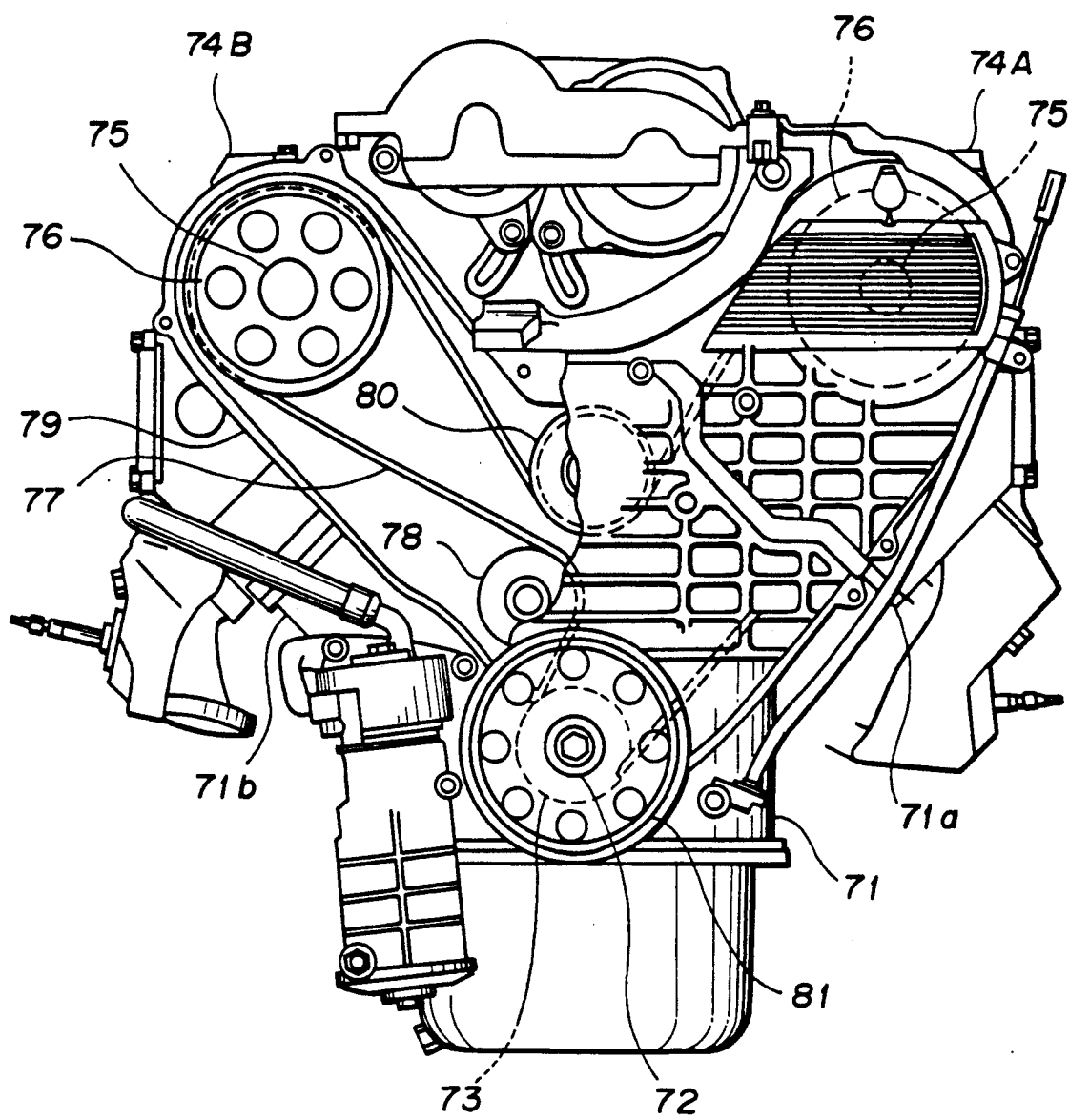
FIG. 4 is a similar view to FIG. 1, illustrating a known V-type engine with a belt cover partly broken.

As shown in FIG. 3, a single chain cover 40 made of aluminum, for example, is securely attached to the cylinder block C by locking bolts (not shown) to be inserted in bolt holes 41, and it conceals the timing chains 6R, 6L. The chain cover 40 is formed with two openings 42R, 42L, one for allowing access to the tensioner 9R and the other for allowing access to a tensioner 9L. In order to mount and remove the tensioners 9R, 9L through the openings 42R, 42L, the openings 42R, 42L are larger in size than the corresponding tensioners 9R, 9L. Further, the openings 42R, 42L are tightly closed by covers (not shown), respectively. It should be noted that the tensioners 9R, 9L are illustrated by one dotted lines in FIG. 3 for showing the chain cover 40 attached to the cylinder block C.

With such a structure, rotation of the crankshaft 1 is transmitted to the large diameter gear 4R₁ of the idler gear 4R through the liming chain 6R, causing rotation of the countershaft 3R. Since the gear ratio of the crank sprocket 5R of the crankshaft 1 to the large diameter gear 4R₁ of the idler gear 4R is determined to be one to two, two rotations of the crankshaft 1 cause the countershaft 3R to rotate once. Subsequently, the rotation of the countershaft 3R is transmitted from the small diameter gears 4R₂ to the camshafts 2e, 2i through the camshaft driving chain 8R and cam sprockets 7R, cyclically opening and closing intake and exhaust valves.

As mentioned above, the two tensioners 9R, 9L provide the tensions to the chains 6R, 6L for preventing the chains 6R, 6L from shaking, and the chain cover 40 for concealing the timing chains 6R, 6L is formed with the openings 42R, 42L positioned in accordance with the tensioners 9R, 9L. Thus, when an adjustment of the tensioners 9R, 9L is needed, the tensioners 9R, 9L are accessible from the outside through the openings 42R, 42L, without removing the chain cover 40, resulting in an improvement in efficiency of the adjustment.

Further, when the cylinder heads H1, H2 are removed from the cylinder block C, the timing chains 6R, 6L should be removed from the idler gears 4R, 4L. In this event, since the releasing bolts 37R, 37L can be loosened or removed from the outside through the openings 42R, 42L, it is possible to release the tensions of the timing chains 6R, 6L without removing the chain cover 40. Thus, the idler gears 4R, 4L, and the cylinder heads H1, H2 are easy to mount or remove, resulting in an improvement in working efficiency.

Furthermore, in this embodiment, the engine is constructed such that the sprocket chambers 34R, 34L are accessible from the side openings 33R, 33L only with the covers 35R, 35L removed. Thus, adjusting a the releasing bolts 38R, 38L from the outside, and removing the tensioners 10R, 10L can easily be carried out, so that it is easy to release the tensions of the camshaft driving chains 8R, 8L, and mount and remove the camshafts 2e, 2i, and the cam sprockets 7R, 7L, resulting in an improvement in working efficiency.

What is claimed is:

1. In a V-type engine having a cylinder block bifurcated to form two cylinder banks, a cylinder head mounted on each of the cylinder banks, and a crankshaft, comprising:
   a first camshaft rotatably mounted to one of the cylinder heads;
   a second camshaft rotatably mounted to the other of the cylinder heads;
   a first chain drivingly interconnecting the crankshaft and said first camshaft;
   a second chain drivingly interconnecting the crankshaft and said second camshaft;
   first and second tensioners so constructed and arranged as to provide the tensions to said first and second chains, respectively;
   a first cover so constructed and arranged as to conceal said first and second chains, said first cover being formed with two openings positioned adjacent said first and second tensioners; and
   a pair of second covers so constructed and arranged as to conceal said two openings in a seal-tight manner.

2. A V-type engine as claimed in claim 1, wherein said openings are larger in size than said tensioners.

3. In a V-type engine having a cylinder block bifurcated to form two cylinder banks, a cylinder head mounted on each of the cylinder banks, and a crankshaft:
   a first pair of camshafts rotatably mounted to one of the cylinder banks;
   a second pair of camshafts rotatably mounted to the other of the cylinder banks;
   a first idler gear rotatably mounted to one of the cylinder banks;
   a second idler gear rotatably mounted to other of the cylinder banks;
   means for drivingly interconnecting one of said first and second pairs of camshafts and one of said first and second idler gears;
   means for drivingly interconnecting the other of said first and second pairs of camshafts and the other of said first and second idler gears;
   a first chain drivingly interconnecting the crankshaft and one of said first and second idler gears;
   a second chain drivingly interconnecting the crankshaft and the other of said first and second idler gears;
   first and second tensions so constructed and arranged as to provide the tensions to said first and second chains, respectively;
   a first cover so constructed and arranged as to conceal said first and second chains, said first cover being formed with two openings positioned adjacent said first and second tensioners; and
   a pair of second covers so constructed and arranged as to conceal said two openings in a seal-tight manner.

* * * * *